United States Patent [19]

Sakuma et al.

[11] Patent Number: 5,723,401

[45] Date of Patent: Mar. 3, 1998

[54] CATALYST FOR THE CONTACT CONVERSION OF LOWER ALIPHATIC ALCOHOLS TO GASOLINE HYDROCARBONS

[75] Inventors: Shuji Sakuma; Kiminori Atsumi; Akira Inose; Hideo Koyama, all of Tokyo, Japan

[73] Assignee: Kabushiki Kaisha Sangi, Tokyo, Japan

[21] Appl. No.: 692,456

[22] Filed: Aug. 5, 1996

Related U.S. Application Data

[62] Division of Ser. No. 227,987, Apr. 15, 1994, Pat. No. 5,545,791, which is a division of Ser. No. 51,784, Apr. 26, 1993, abandoned.

[30] Foreign Application Priority Data

| Apr. 28, 1992 | [JP] | Japan | 4-134397 |
| Jul. 24, 1992 | [JP] | Japan | 4-217498 |

[51] Int. Cl.$^6$ .................. B01J 27/18; B01J 27/185; B01J 27/186; B01J 27/187

[52] U.S. Cl. .................. 502/213; 502/208

[58] Field of Search .................. 502/208, 213

[56] References Cited

U.S. PATENT DOCUMENTS

| 2,920,049 | 1/1960 | Romanovsky et al. | |
| 3,679,601 | 7/1972 | Nolan et al. | |
| 4,017,424 | 4/1977 | Johnson et al. | 502/213 |
| 4,018,706 | 4/1977 | Inoue et al. | |
| 4,246,247 | 1/1981 | Batalin et al. | 423/311 |
| 4,327,234 | 4/1982 | Nowack et al. | 585/267 |
| 4,398,050 | 8/1983 | Hofstadt et al. | 585/640 |
| 4,429,055 | 1/1984 | Nott | |
| 4,570,025 | 2/1986 | Nowack et al. | 502/208 |
| 4,705,768 | 11/1987 | Coombs et al. | 502/213 |
| 4,758,544 | 7/1988 | Plesko et al. | 502/208 |
| 4,916,104 | 4/1990 | Isogai et al. | 502/213 |
| 5,186,814 | 2/1993 | Bedard | 208/46 |
| 5,242,880 | 9/1993 | Irick, Jr. | 502/208 |
| 5,292,701 | 3/1994 | Glemza et al. | 502/202 |

FOREIGN PATENT DOCUMENTS 0 141 662  5/1985  European Pat. Off.

*Primary Examiner*—Elizabeth D. Wood
*Attorney, Agent, or Firm*—Finnegan, Henderson, Farabow, Garrett & Dunner

[57] ABSTRACT

A catalyst for contact conversion of lower aliphatic alcohols such as methanol to form petroleum type hydrocarbons comprises one or more metals and/or metal ions supported on a phosphate carrier. Preferred metals include transition metals such as Ti, Ni, Cu, Zn, Rh, Ag, Ir and alkali metals, alkaline earth metals, Al and Sn. The phosphate carrier is preferably aluminium phosphate, zirconyl phosphate, magnesium phosphate, barium phosphate, zinc phosphate or a calcium phosphate compound. The metal should amount to 0.1 to 30% by weight with respect to the phosphate carrier. This catalyst is used to contact convert lower aliphatic alcohols to produce the gasoline type hydrocarbons at a reaction temperature of 200° to 600° C. and a supply rate of 0.75 to 3.0 weight units of alcohol per weight unit of catalyst per hour.

2 Claims, No Drawings

CATALYST FOR THE CONTACT CONVERSION OF LOWER ALIPHATIC ALCOHOLS TO GASOLINE HYDROCARBONS

This application is a division of application Ser. No. 08/227,987, filed Apr. 15, 1994 now U.S. Pat. No. 5,545,791 issued Aug. 13, 1996 which is a division of application Ser. No. 08/051,784, filed Apr. 26, 1993, now abandoned.

DESCRIPTION

1. Technical Field

The invention relates to a phosphate based catalyst for use in the contact conversion of lower alkanols and to a method for the contact conversion of lower alkanols to gasoline hydrocarbons, in which method the phosphate based catalyst is used.

2. Prior Art

Because petroleum has become expensive, it is now of interest to produce petroleum products (such as gasoline, kerosene and light and heavy oils) from other hydrocarbon materials such as coal and natural gas. The MTG (Methanol to Gasoline) method developed by Mobil Co. enables a mixture of aromatic hydrocarbons having less than 10 carbon atoms, olefin hydrocarbons and paraffin hydrocarbons to be produced from methanol in the presence of ZSM-5 zeolite having a specific pore structure as a catalyst at a temperature of from 250° C. to 450° C. The disadvantages of this method lie in the ZSM-5 catalyst, which is expensive and time consuming to make due to the long time needed for crystallization, is not easily made to a reproducible standard, and quickly loses its effectiveness due to the accumulation of solids in the MTG reaction. An alternative catalyst is therefore sought.

THE INVENTION

The invention provides a catalyst for the contact conversion of lower alkanols, the catalyst comprising one or more metals and/or metal ions selected from the transition metals, the alkali metals, the alkaline earth metals and the metals of groups IIIb and IVb of the periodic table according to Mendeleev supported on a phosphate carrier.

The phosphate compound used as a carrier in the catalyst of the invention is preferably aluminium phosphate, zirconyl phosphate, magnesium phosphate, barium phosphate, zinc phosphate or a calcium phosphate compound, or a mixture of two or more thereof. The preferred calcium phosphate compounds are hydroxyapatite, calcium tertiary phosphate, calcium primary phosphate, calcium secondary phosphate, calcium pyrophosphate, calcium metaphosphate, fluoroapatite, calcium quarternary phosphate and calcium octaphosphate. Such phosphate compounds, which may be non-stoichiometric, provide the multifunctional properties to the catalyst, because they have the acidic and basic functional properties and ion exchange property, in which the relatively weak acidic and basic points act together.

The preferred transition metals/metal ions for use in catalysts according to the invention include Ti, V, Cr, Mn, Fe, Co, Ni, Cu, Zn, Ru, Rh, Pd, Ag, La, Ce, W, Re, Ir, Pt and Au. Alkali metals such as K and Rb, alkaline earth metals such as Mg, Ca, Sr and Ba, the aluminium family metals such as Al and In, and the carbon family metals such as Si, Ge, Sn and Pb are also preferred. Most preferably the metals and/or metal ions are selected from Ti, Ni, Cu, Zn, Rh, Ag, Ir, Pt, Mg, Ca, Ba, Al and Sn.

The amount of metal and/or metal ions to be supported on the phosphate carrier will generally depend upon the nature of the metal(s) and of the phosphate carrier. Too high a proportion of metal and/or metal ion, however, may reduce the catalytic activity, so it is preferred that the amount of metal and/or metal ion is 50% or less by weight with respect to the phosphate based compound, preferably 0.1 to 30% by weight.

The catalysts of the invention may be prepared by methods known per se, such as the ion exchanging method, the permeability method and the physical mixing method. The catalysts can also be obtained by synthesizing the phosphate carrier in the presence of one or more of the metals and/or ions to be supported on it.

For instance, a solution of one or more salts of the aforesaid metals is added (or two or more solutions, each of a salt of a different one of the aforesaid metals, are successively added) to a solution or suspension of the phosphate carrier, and stirred to ensure full dispersion. The temperature can be from room temperature to boiling point. The pH is adjusted, if necessary, and the precipitate is collected.

Uniform dispersion may be aided by adding agents such as the salts of phosphoric, nitric and hydrochloric acids to the aqueous solution or suspension. It is desirable that the reaction time is from one or several hours when the reaction mixture is heated or from one or several days when the reaction temperature is low, e.g. room temperature. The precipitate obtained is washed with water, dried and powdered. It may be heat fired. Drying is preferably effected at a temperature of more than 100° C., preferably 200° C. to 400° C., for 1 to 24 hours.

The catalysts according to the invention can be used in the form of powders, as granulates produced by spray drying of suspension, and in honey comb states and raschig ring states produced by pressure and injection molding. Thus various physical forms are suitable, but it is generally desirable to use the catalyst after heat firing at a temperature of 1400° C. or less. Other activation processes such as heat treatment in inert gas or reduction treatment in a reducing atmosphere can be used. The catalytic activity can be improved by these treatments and the catalytic properties can be adjusted to suit the nature of the lower aliphatic alcohols to be contact converted.

When a metal salt is deposited on the carrier, and heated to form a catalyst according to the invention, the salt will decompose depending upon the atmosphere, temperature and heating time. If the metal of the metal salt is one which has an oxide which is thermally unstable in air, such as Pt or Ag, and the heating temperature in air is less than the decomposition temperature, the metal is carried on the carrier as the metal ion; when the heating temperature in air is more than the decomposition temperature, the metal is carried on the carrier as the metal.

In air, salts of metals having thermally stable oxides are converted to the metal oxides by the heating process. In inert gases or reducing gases such as hydrogen, however, the metal oxides will be converted first to metal ions, then to a combination of metal ions and metals, and finally to metals only at a low temperature in the range of 100° to 400° C. according to the heating time. As a result catalysts carrying metal ions, a combination of metal ions and metals, or metals only may be obtained by adjustment of the temperature and the time as mentioned above. It is noted that, in the application of this process to the production of a catalyst according to the invention, the conversion rate varies depending upon the type of metal oxide, the temperature and the heating time. In the case of full conversion to the metal, the catalytic activity is lowered. The conversion rate may be chosen so as to avoid this.

The invention also provides a method for the preparation of petroleum type hydrocarbons, the method comprising contacting an alkanol, alkanediol, polyol or hydrated alcohol (alcohol containing admixed water) having from 1 to 4 carbon atoms with a catalyst according to the invention.

The contact conversion process of the invention can be performed in various gas atmospheres, for example in nitrogen, hydrogen, $CO_2$, argon or helium. Also, the reaction can be carried out by various means, such as a fixed bed process, a moving bed process or a fluidized bed process. The fixed bed process is easy to operate, and so is preferred.

The reaction temperature may vary according to the lower aliphatic alcohol to be converted. However, the yield of gasoline type hydrocarbons is decreased when the reaction temperature is low and the deterioration of catalytic activity is accelerated by forming the cokes, and the regeneration of catalyst is increased when the reaction temperature is high, so it is desirable to use a reaction temperature from 200° C. to 600° C.

WHSV (Weight Hourly Space Velocity), by which the supply speed of the material, lower aliphatic alcohol, per gram of the catalyst is shown (g.methanol/g.catalyst.hr), is not particularly limited, however 15 or less is desirable to obtain a high conversion rate. Particularly, the range from 0.75 to 3.0 is desirable.

The catalysts of the invention are easily prepared at a low price. Gasoline type hydrocarbons can be obtained from lower alkanols in high yield.

PREFERRED EMBODIMENTS

EXAMPLE 1

300 g of aluminium phosphate was suspended under stirring in 2 l of ion exchanged water. 0.6 g of silver nitrate in aqueous solution was added to this suspension and stirred for 3 days. The solids were then recovered, washed with water and dried at 300° C. to give a powdered catalyst composition containing 0.1% silver.

EXAMPLE 2

200 g of zirconyl phosphate was suspended under stirring in 2 l of ion exchanged water. 20 g of copper nitrate in aqueous solution and 27 g of zinc nitrate, also in aqueous solution, were added to this suspension and stirred for 3 days. The solids were then recovered, washed with water and dried at 200° C. to give a powdered catalyst composition containing 2.5% copper and a 2.0% zinc.

EXAMPLE 3

200 g of barium phosphate was suspended under stirring in 2 l of ion exchanged water. 3.5 g of chloroplatinic acid in aqueous solution, 3.0 g of silver nitrate in aqueous solution and 13 g of aluminium nitrate in aqueous solution were added to this suspension and stirred for 1 day. The solids were then recovered, washed with water and dried at 150° C. to give a powdered catalyst composition containing 0.5% platinum, 0.5% silver and 0.3% aluminium.

EXAMPLE 4

200 g of magnesium phosphate was added to 2 l of ion exchanged water, and the whole was stirred and heated to 85° C. to obtain a suspension. 6.5 g of tin chloride in aqueous solution and 30 g of titanium sulphate, also in aqueous solution, were successively added to the suspension, while keeping the temperature at 85° C. Stirring was continued for 8 hours at 85° C., following which the solids were recovered, washed with water and dried at 400° C. A powdered catalyst composition containing 1.9% tin and 2.6% titanium was obtained.

EXAMPLE 5

200 g of zinc phosphate was suspended under stirring in 2 l of ion exchanged water. To the suspension there were successively added aqueous solutions containing 19 g of barium nitrate, 15 g of iridium (II) chloride, 35 g of rhodium (III) sulphate, 45 g of calcium nitrate, 150 g of magnesium sulphate and 25 g of silver nitrate. Stirring was continued for 4 days. The solids were then recovered, washed with water and dried at 150° C. to give a powdered catalyst composition containing 4% of barium, 4.5% of iridium, 4.5% of rhodium, 3.0% of calcium, 7.0% of magnesium and 6.5% of silver.

EXAMPLE 6

200 g of magnesium phosphate was suspended under stirring in 3 l of ion exchanged water. 15 g of nickel nitrate in aqueous solution and 18 g of zinc nitrate, also in aqueous solution, were added to the suspension and stirred for 5 days. The solids were recovered, washed with water and dried at 200° C. to give a powdered catalyst composition containing 1.3% of nickel and 1.5% zinc.

EXAMPLE 7

300 g of calcium tertiary phosphate was suspended under stirring in 2 l of ion exchanged water. An aqueous solution containing 0.6 g of silver nitrate was added to the suspension and the mixture stirred for 2 days. The solids were recovered, washed with water and dried at 350° C. to give a powdered catalyst composition containing 0.1% of silver.

EXAMPLE 8

200 g of calcium tertiary phosphate was suspended in 2 l of ion exchanged water under stirring. 20 g of copper nitrate in aqueous solution and 27 g of zinc nitrate, also in aqueous solution, were successively added to the suspension. Stirring was continued for 4 days, and the solids were then recovered. After washing with water and drying at 200° C., a powdered catalyst composition containing 2.5% of copper and 2% of zinc was obtained.

EXAMPLE 9

200 g of hydroxyapatite was added to 2 l of ion exchanged water and stirred to obtain a suspension. Aqueous solutions respectively containing 3.5 g of chloropratinic acid, 3 g of zinc nitrate and 13 g of aluminium nitrate were successively added to the suspension, which was then stirred for one day. The solids were recovered, washed with water and dried at 150° C. to give a powdered catalyst composition containing 0.5% of platinum, 0.2% of zinc and 0.3% of aluminium.

EXAMPLE 10

100 g of hydroxyapatite was added to 1 l of ion exchanged water, and the whole was stirred and heated to 85° C. to obtain a suspension. 6.5 g of tin chloride in aqueous solution and 30 g of titanium (IV) sulphate, also in aqueous solution, were successively added to the suspension. Stirring was continued at 85° C. for 8 hours. The solids were then recovered, washed with water and dried at 400° C. A powdered catalyst composition containing 3.5% of tin and 5.0% of titanium was obtained.

EXAMPLE 11

200 g of calcium secondary phosphate was suspended under stirring in 2 l of ion exchanged water. To the suspension there were successively added aqueous solutions containing 19 g of barium nitrate, 15 g of iridium (II) chloride, 35 g of rhodium (III) sulphate, 45 g of zinc nitrate, 150 g of magnesium sulphate and 25 g of silver nitrate. Stirring was continued for 5 days, following which the solids were recovered, washed with water and dried at 120° C. A powdered catalyst composition containing 4% of barium, 4.5% iridium, 4% of rhodium, 4% of zinc, 7% of magnesium and 6.5% of silver was obtained.

EXAMPLE 12

200 g of calcium hydroxide was added to 3 l of ion exchanged water in which there had been dissolved 9 g of silver nitrate and 12 g of zinc nitrate. The mixture was stirred to obtain a solution. Aqueous phosphoric acid was added to the solution and hydroxyapatite was produced by the usual process. After stirring for 3 days, the solids were recovered. Washing with water and drying at 200° C. gave a powdered catalyst composition containing 1.7% of silver and 0.8% of zinc.

COMPARATIVE EXAMPLE 1

500 g of aluminium phosphate was suspended under stirring in 5 l of ion exchanged water. 0.4 g of silver nitrate in aqueous solution was added to the suspension, which was stirred for 2 days. The solids were then recovered, washed with water and dried at 300° C. A powdered catalyst composition containing 0.03% of silver was obtained.

COMPARATIVE EXAMPLE 2

200 g of magnesium oxide was added to 2 l of ion exchanged water and stirred to form a suspension. The suspension was heated to 85° C. 6.5 g of tin chloride in aqueous solution and 30 g of titanium sulphate, also in aqueous solution, were successively added to the suspension at 85° C. Stirring at 85° C. was continued for 8 hours. The solids were then recovered, washed with water and dried at 400° C. to give a powdered catalyst composition containing 1.9% of tin and 2.6% of titanium.

COMPARATIVE EXAMPLE 3

500 g of calcium tertiary phosphate was suspended under stirring in 5 l of ion exchanged water. 0.4 g of silver nitrate in aqueous solution was added to the suspension, which was then stirred for 2 days. The solids were then recovered, washed with water and dried at 350° C. A powdered catalyst composition containing 0.04% of silver was obtained.

COMPARATIVE EXAMPLE 4

100 g of alumina was added to 1 l of ion exchanged water and stirred to obtain a suspension. The suspension was heated to 85° C. 6.5 g of tin chloride in aqueous solution and 30 g of titanium (IV) sulphate, also in aqueous solution, were successively added to the suspension at 85° C. Stirring was continued at 85° C. for 8 hours, following which the solids were recovered, washed with water and dried at 400° C. A powdered catalyst composition containing 5.0% of titanium and 3.5% of tin was obtained.

COMPARATIVE EXAMPLE 5

200 g of calcium hydroxide was dissolved in 3 l of ion exchanged water. Aqueous phosphoric acid was added to the solution and hydroxyapatite was produced by the usual process. After stirring for 3 days, the solids were recovered, washed with water and dried at 200° C. Hydroxyapatite powder was obtained.

EXAMPLE 13

Lower alkanols were submitted to a contact conversion reaction in the presence of 1.0 g of each of the catalysts obtained in Examples 1 to 6 and Comparative Examples 1 and 2. The reaction conditions were as follows:

reaction temperature: 400° C.

nitrogen flow rate: 3.0 l/hour alcohol flow rate: 2.0 g/hour

WHSV (supply speed of the material alcohol/g.catalyst): 2 hour$^{-1}$ reaction pressure: atmospheric pressure The results obtained are shown in Tables 1 and 2. The results for the catalysts of Examples 1, 2, 4, 5, and 6 and of Comparative Examples 1 and 2 are those obtained after the alcohols were supplied for 8 hours. The results for the catalyst of Example 3 are those obtained after the alcohol was supplied for 8 hours (3-1) and for 80 hours (3-2).

TABLE 1

| sample | example 1 | example 2 | example 3-1 | example 3-2 | example 4 | example 5 | example 6 |
| --- | --- | --- | --- | --- | --- | --- | --- |
| supplied alcohol | methanol | methanol | methanol | methanol | ethanol | ethanol | propanol |
| conversion rate (%) | 85 | 87 | 84 | 83 | 85 | 87 | 88 |
| composition (Wt %) | | | | | | | |
| ethers | 1.8 | 1.8 | 1.7 | 1.9 | 1.7 | 1.9 | 2.0 |
| C1 | 2.3 | 2.1 | 2.5 | 2.4 | 1.8 | 1.0 | 1.2 |
| C2 | 0.4 | 0.9 | 0.7 | 0.7 | 2.6 | 3.5 | 3.7 |
| C3 | 11.5 | 10.3 | 9.5 | 9.8 | 10.0 | 10.6 | 10.1 |
| C4 | 8.4 | 9.6 | 7.6 | 7.3 | 9.1 | 9.2 | 10.4 |
| C5 | 7.2 | 9.1 | 6.8 | 7.0 | 9.5 | 8.1 | 9.9 |
| C5 above | 68.4 | 66.2 | 71.2 | 70.9 | 65.3 | 65.7 | 62.7 |

TABLE 2

| sample | comparative example 1 | comparative example 2 |
| --- | --- | --- |
| supplied alcohol | methanol | ethanol |
| conversion rate (%) | 42 | 41 |
| composition (Wt %) | | |
| ethers | 23.2 | 24.2 |
| $C_1$ | 3.2 | 2.6 |
| $C_2$ | 71.9 | 69.7 |
| $C_3$ | 1.7 | 3.5 |
| $C_4$ | — | — |
| $C_5$ | — | — |
| $C_5$ above | — | — |

EXAMPLE 14

Lower alkanols were submitted to a contact conversion reaction in the presence of 1.0 g of each of the catalysts obtained in Examples 7 to 12 and Comparative Examples 3 to 5. The reaction conditions were as follows:

reaction temperature: 420° C.

nitrogen flow rate: 3 l/hour alcohol flow rate: 2.0 g/hour

WHSV: 2 hour$^{-1}$ reaction pressure: atmospheric pressure reactor: microreactor The results obtained are shown in Tables 3 and 4. The results for the catalysts of Examples 7 and 9 to 12 and of Comparative Examples 3 to 5 are those obtained after the alcohols were supplied for 8 hours. The results obtained for the catalyst of Example 8 are those obtained after the alcohol was supplied for 8 hours (8-1) and 80 hours (8-2). A similar reaction was carried out using silver powder as catalyst and the result obtained after the alcohol was supplied for 8 hours is shown in Table 4 as Comparative Example 6.

We claim:

1. A catalyst composition for the contact conversion of lower aliphatic alcohols to gasoline hydrocarbons, the catalyst consisting essentially of one or more metals or metal ions selected from the group consisting of Ti, Mn, Fe, Co, Cu, Pt, Ir, Rh, Ag, Zn and Sn supported on at least one phosphate based compound selected from the group consisting of a calcium phosphate compound, magnesium phosphate, barium phosphate and zinc phosphate, wherein the metal or metal ion is present in the catalyst composition in an amount of from 0.1 to 50% by weight of the phosphate based compound.

2. The catalyst composition of claim 1, wherein said phosphate based compound is a calcium phosphate compound selected from the group consisting of hydroxyapatite and calcium tertiary phosphate.

TABLE 3

| sample | example 7 | example 8-1 | example 8-2 | example 9 | example 10 | example 11 | example 12 |
|---|---|---|---|---|---|---|---|
| supplied alcohol | methanol | methanol | methanol | methanol | ethanol | methanol | propanol |
| conversion rate (%) | 90 | 92 | 92 | 91 | 93 | 85 | 90 |
| composition (Wt %) | | | | | | | |
| ethers | 1.7 | 1.8 | 1.9 | 1.7 | 1.9 | 1.7 | 2.0 |
| C1 | 2.4 | 2.5 | 2.4 | 2.4 | 1.0 | 3.6 | 1.0 |
| C2 | 0.5 | 0.5 | 0.4 | 0.4 | 3.0 | 3.5 | 3.1 |
| C3 | 10.5 | 9.0 | 10.1 | 9.5 | 9.0 | 10.3 | 10.0 |
| C4 | 8.2 | 12.1 | 12.0 | 10.0 | 11.3 | 8.9 | 12.1 |
| C5 | 5.0 | 10.5 | 8.6 | 8.0 | 10.1 | 12.5 | 10.3 |
| C5 above | 71.7 | 63.6 | 64.6 | 68.0 | 63.7 | 59.5 | 61.5 |

TABLE 4

| sample | comparative example 3 | comparative example 4 | comparative example 5 | comparative example 6 |
|---|---|---|---|---|
| supplied alcohol | propyl-alcohol | methanol | ethanol | methanol |
| conversion rate (%) | 40 | 43 | 43 | 48 |
| composition (Wt %) | | | | |
| ethers | 20.0 | 19.0 | 23.5 | 24.5 |
| $C_1$ | 11.0 | 2.4 | 5.0 | 9.0 |
| $C_2$ | 68.0 | 77.1 | 70.0 | 64.4 |
| $C_3$ | 1.0 | 1.5 | 1.5 | 2.1 |
| $C_4$ | — | — | — | — |
| $C_5$ | — | — | — | — |
| $C_5$ above | — | — | — | — |

* * * * *